United States Patent [19]

Takeda et al.

[11] Patent Number: 4,519,697
[45] Date of Patent: May 28, 1985

[54] IMAGE FORMING APPARATUS

[75] Inventors: Hiroaki Takeda; Kano Tanaka, both of Yokohama; Shinji Murata, Tokyo, all of Japan

[73] Assignee: Canon Kabushiki Kaisha, Tokyo, Japan

[21] Appl. No.: 641,403

[22] Filed: Aug. 14, 1984

Related U.S. Application Data

[63] Continuation of Ser. No. 293,879, Aug. 18, 1981, abandoned.

[30] Foreign Application Priority Data

Aug. 25, 1980 [JP] Japan ................... 55-116850

[51] Int. Cl.³ ............................................. G03G 15/00
[52] U.S. Cl. ................................. 355/14 R; 355/3 R; 355/8
[58] Field of Search ............... 355/14 R, 8, 11, 13, 355/3 R

[56] References Cited

U.S. PATENT DOCUMENTS

| | | | |
|---|---|---|---|
| 3,586,450 | 6/1971 | Hosey et al. | 355/8 |
| 3,653,756 | 4/1972 | Mielnikowski et al. | 355/3 R |
| 3,669,535 | 6/1972 | Hyosaka et al. | 355/3 R X |
| 4,027,965 | 6/1977 | Mikasa et al. | 355/13 |
| 4,126,389 | 11/1978 | Ikeda et al. | 355/8 X |
| 4,139,300 | 2/1979 | Katayama et al. | 355/3 R X |
| 4,183,660 | 1/1980 | Bujese | 355/8 X |
| 4,222,659 | 9/1980 | Komori et al. | 355/14 R |
| 4,270,857 | 6/1981 | Komori et al. | 355/8 |
| 4,303,332 | 12/1981 | Sakai | 355/14 R |
| 4,332,462 | 6/1982 | Yagasaki et al. | 355/8 X |
| 4,372,673 | 2/1983 | Tomosada et al. | 355/8 X |

OTHER PUBLICATIONS

Appln. Ser. No. 932,655 filed 8/10/79, now abandoned, to Katayama et al.
Appln. Ser. No. 304,565 filed 9/22/81, still pending, to Katayama et al.

Primary Examiner—A. C. Prescott
Attorney, Agent, or Firm—Fitzpatrick, Cella, Harper & Scinto

[57] ABSTRACT

An image forming apparatus has a reciprocatingly movable member for forming an image on a record medium. The reciprocatingly movable member is moved and set to a predetermined home position before a first image is formed. A sensor is associated with the moving and setting operation of the reciprocatingly movable member. An error is detected if the sensor does not sense within a predetermined time which is clocked in synchronism with a control means.

23 Claims, 16 Drawing Figures

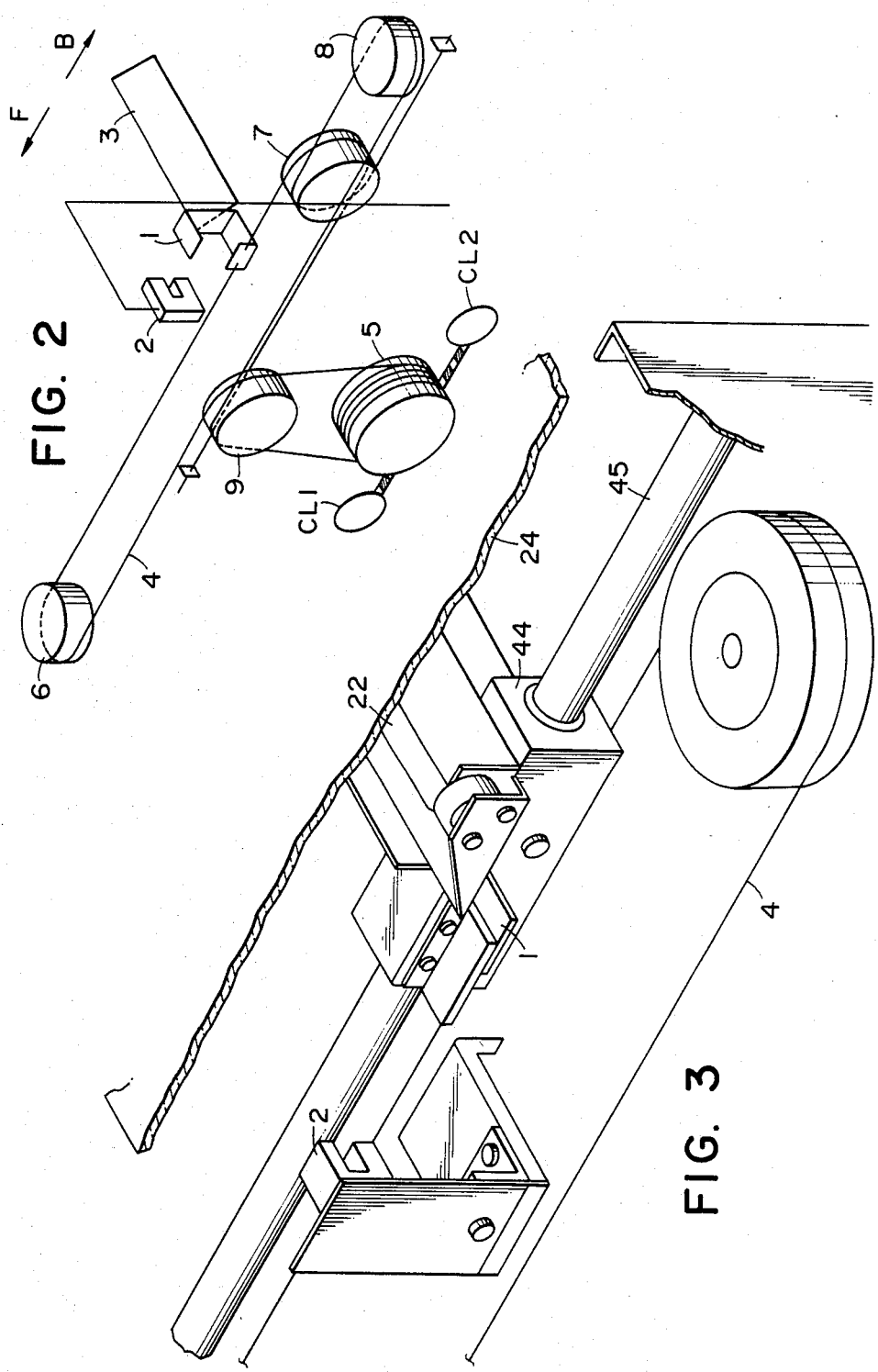

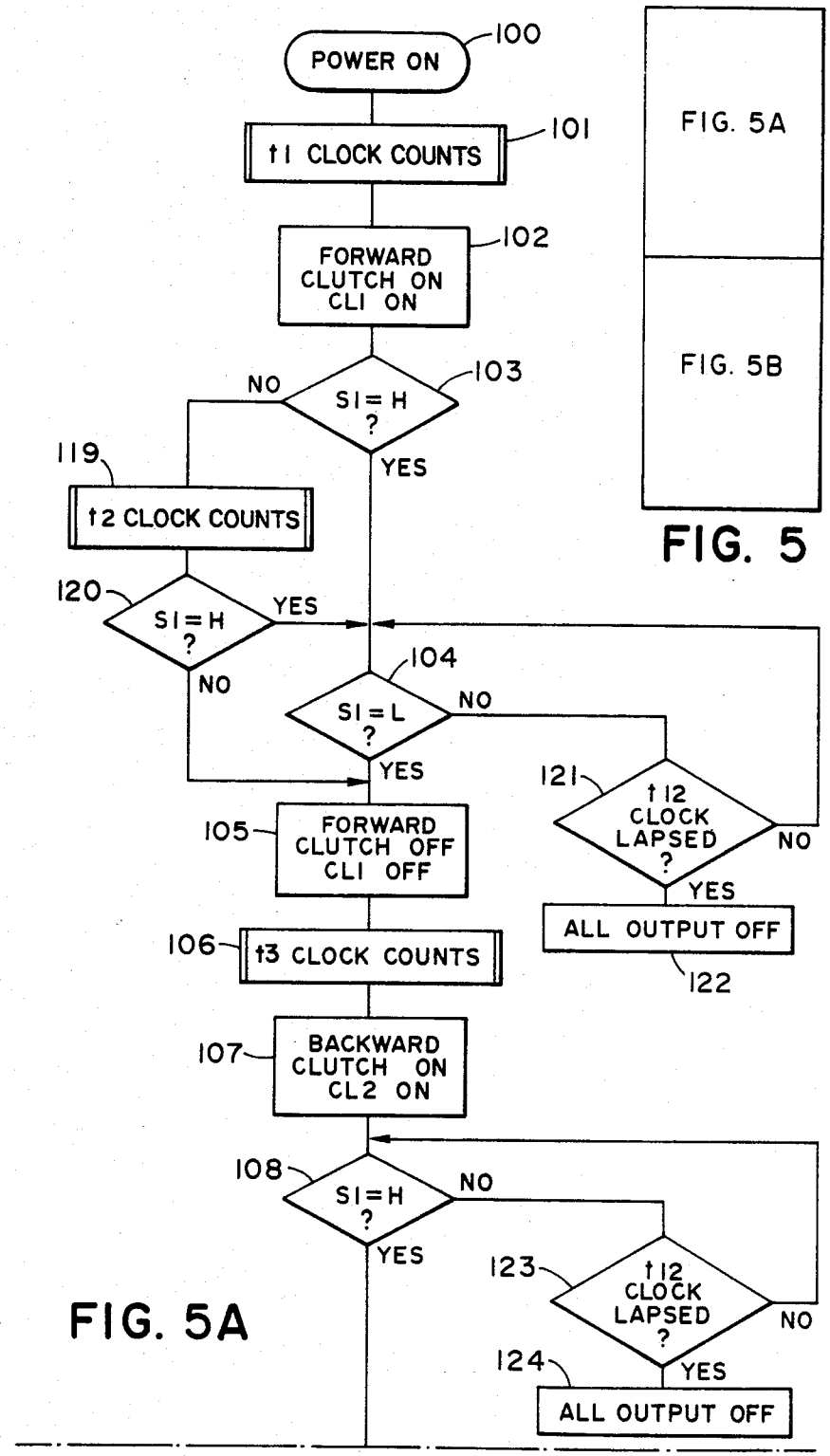

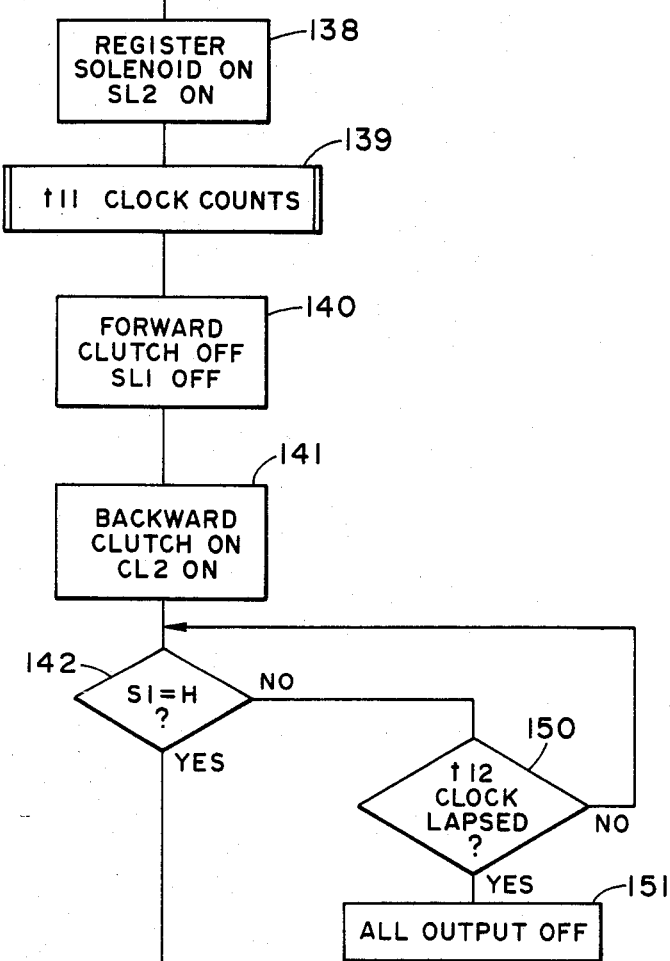
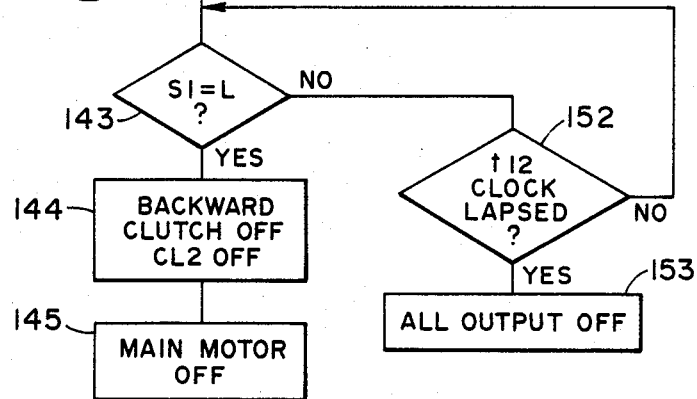
FIG. 7B

IMAGE FORMING APPARATUS

This application is a continuation of application Ser. No. 293,879 filed Aug. 18, 1981, now abandoned.

BACKGROUND OF THE INVENTION

1. Field of the Invention

The present invention relates to an image forming apparatus and, more particularly, to an image forming apparatus having a movable member for forming an image.

2. Description of the Prior Art

In a conventional image forming apparatus, a copying process including charging image scan, exposure, developing, transfer and fixing steps is sequence-controlled by control signals from a number of cams and microswitches or by a microcomputer which processes those signals.

In addition to those used for the sequence control, many sensors for detecting error conditions of the apparatus are also included in the image forming apparatus.

Accordingly, in an apparatus which safisfies a high level of control and detection, the configuration of the signal generation and signal processing tends to be complicated.

SUMMARY OF THE INVENTION

It is an object of the present invention to provide an image forming apparatus which has overcome the above difficulties.

It is another object of the present invention to simplify the construction of the apparatus by providing a plurality of control and detection functions to detection means which is activated by a movable member for forming an image.

It is a further object of the present invention to position a movable member of the apparatus to a predetermined home position when the apparatus has power on in order to allow rapid and exact image producing operation.

BRIEF DESCRIPTION OF THE DRAWINGS

FIG. 2 shows a schematic diagram of a signal generating unit of the copying machine shown in FIG. 1;

FIG. 3 shows a perspective view of the signal generating unit of the copying machine shown in FIG. 1;

FIGS. 5A and 5B and 7A and 7B, which are arranged as shown in FIGS. 5 and 7, respectively, show control flow charts;

DETAILED DESCRIPTION OF THE PREFERRED EMBODIMENTS

Figure 1:
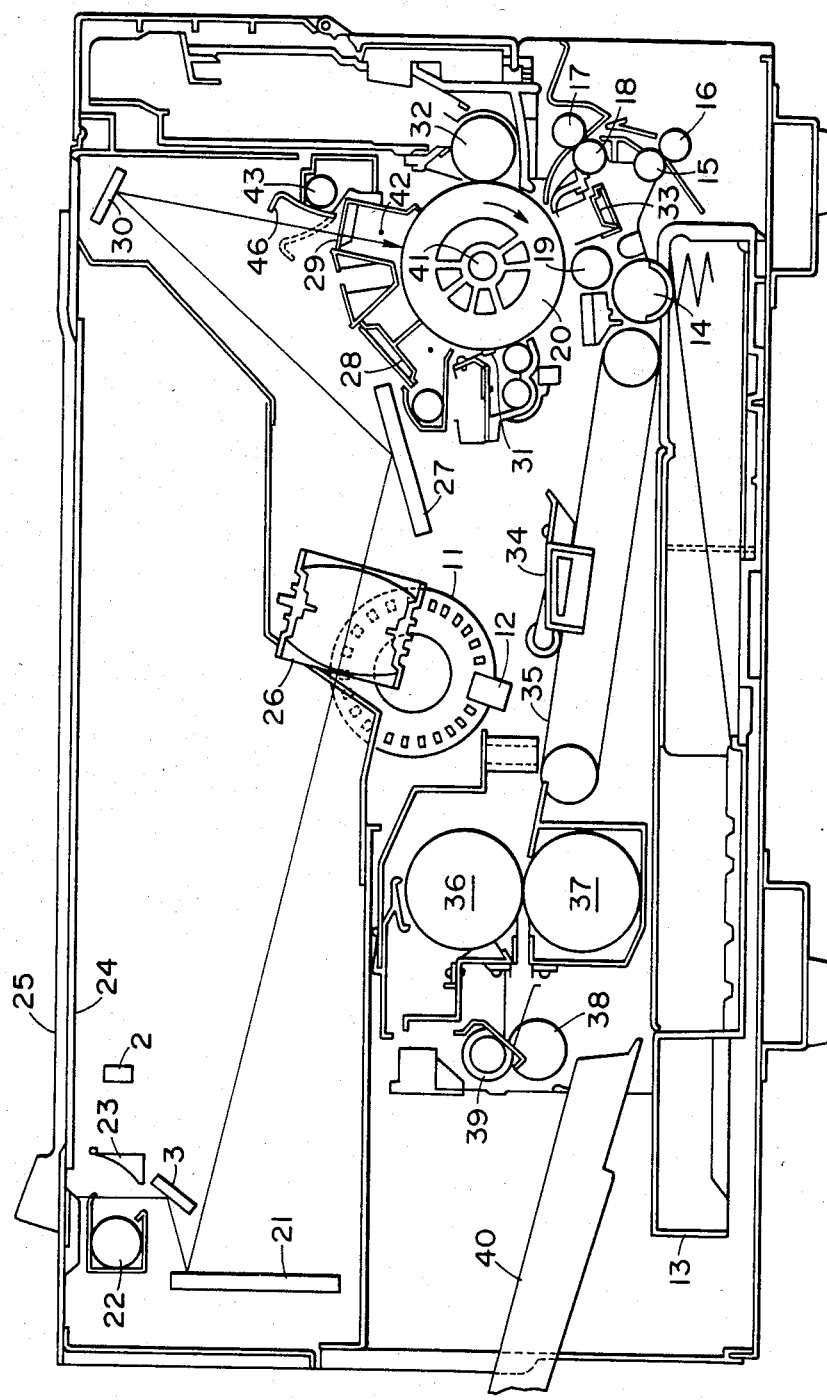
FIG. 1 shows a schematic view of a copying machine of the present invention.

FIG. 1 shows a schematic view of a copying machine in accordance with one embodiment of the present invention. In the present embodiment, the present invention is implemented in a stationary text table type copying machine. The present invention may readily be applied to a movable text table type copying machine.

A surface of a photosensitive drum 20 comprises a photosensitive material of a photoconductor. The drum 20 is rotatably supported by a shaft 41, and starts to rotate in the direction of an arrow in response to a copy instruction.

As the photosensitive drum 20 rotates to a predetermined position, a text mounted on a text table glass 24 and fixed in position by a text table cover 25 is illuminated by a light ray emanated from an illumination lamp 22 integrated with a first mirror 3 and reflected by a main reflection plate 23. The reflected light is scanned by the first mirror 3 and a second mirror 21. The first mirror 3 and the second mirror 21 are moved at a velocity ratio of 1 to ½ so that the text is scanned with an optical path length in front of a lens 26 being kept constant.

The reflected optical image is transmitted through the lens 26, is reflected by a third mirror 27 and a fourth mirror 30 and is focused on the photosensitive drum 20 at an exposing station 29.

The photosensitive drum 20 is charged (for example, positively) by a primary charger 28 and slit-exposed by the image irradiated by the illumination lamp 22 at the exposing station 29.

At the same time, the photosensitive drum 20 is discharged by A.C. or to the opposite polarity (for example, negative) to the primary charging by a discharger 42, and then it is flat-exposed by a flat exposure lamp 43 to produce a high contrast electrostatic latent image on the photosensitive drum 20. The electrostatic latent image on the photosensitive drum 20 is then visualized as a toner image by a developer 32.

A transfer paper P, not shown, in a cassette 13 is transported into the machine by a paper feed roller 14 and fed to register rollers 17 and 18 by conveyor rollers 15 and 16. It is exactly timed by the register rollers 17 and 18 and then fed toward the photosensitive drum 20.

While the transfer paper P passes through a gap between a transfer charger 33 and the photosensitive drum 20, the toner image on the photosensitive drum 20 is transferred onto the transfer paper.

After the transfer, the transfer paper is separated from the photosensitive drum 20 by a separation roller 19 and guided to a conveyor belt 35, which is provided with a paper pressing roller 34. The transfer paper is further guided to fixing roller pair 36 and 37 where it is pressed and heated to effect fixing. Then, it is ejected to a tray 40 by paper ejection rollers 38 and 39.

After the transfer, the surface of the photosensitive drum 20 is cleaned by a cleaner having an elastic blade 31 and then the next cycle starts. Numeral 46 denotes a blank shutter which selects an image exposure or a blank exposure to the photosensitive drum 20.

In order to detect a moving position of the optical system including the first mirror 3, the illumination lamp 22 and the second mirror 21 for exposing and scanning the text, a photo-interrupter 2 serving as a signal source is mounted at a fixed position.

The position of the photo-interrupter 2 may be moved along the direction of movement of the mirror 3.

In order to time the copying operation, a timing disc 11 which is rotated in synchronism with a main motor, not shown, and a photo-interrupter 12 for detecting the rotation of the timing disc 11 are also provided. Signals from the photo-interrupters 2 and 12 are supplied to a microcomputer, not shown, which controls the copying operation in response to the supplied signals.

FIG. 2 shows a schematic diagram of a signal generation unit in the movable optical system.

Numeral 1 denotes a light screen mounted on the movable mirror 3, numeral 2 denotes the photo-interrupter serving as the signal source fixed at a predetermined position, numeral 3 denotes the first mirror of the movable optical system, numeral 4 denotes a wire for moving the mirror 3 on which the light screen 1 is mounted, numeral 5 denotes a wire pulley for driving the wire 4 and numerals 6, 7, 8 and 9 denote pulleys for guiding the wire 4. As the wire 4 is pulled by the rotation of the wire pulley 5, the mirror 3 is advanced (in the direction of an arrow F) or retracted (in the direction of an arrow B).

FIG. 3 shows a detail of the signal generation unit.

Numeral 1 denotes the light screen, numeral 2 denotes the photo-interrupter, numeral 22 denotes the illumination lamp, numeral 24 denotes the text table glass and numeral 44 denotes an illumination lamp table of the optical system which is moved on a rail 45 by the wire 4.

The light screen 1 comprises two plates as shown in FIG. 3, one being fixed to the illumination lamp table 44 while the other being movable along the direction of the movement of the mirror 3. Thus, by moving the movable plate the overall length of the light screen may be varied.

The operation of the signal generation by the photo-interrupter 2 is now explained.

In the present embodiment, a stationary text table type copying machine is explained, although a similar effect can be attained by a movable text table type copying machine.

The photo-interrupter 2 fixed at the predetermined position produces a LOW signal (hereinafter referred to as L) when the power to the apparatus is turned on so that a predetermined voltage is supplied and an LED is turned on. As the copying machine operates and the movable optical system moves such that the light screen 1 mounted on the mirror 3 is positioned at the photo-interrupter 2, the LED is interrupted and the photo-interrupter 2 produces a HIGH signal (hereinafter referred to as H). Thus, the photo-interrupter signal S1 changes depending on the presence or absence of the light screen 1 in the photo-interrupter 2.

Figure 4:
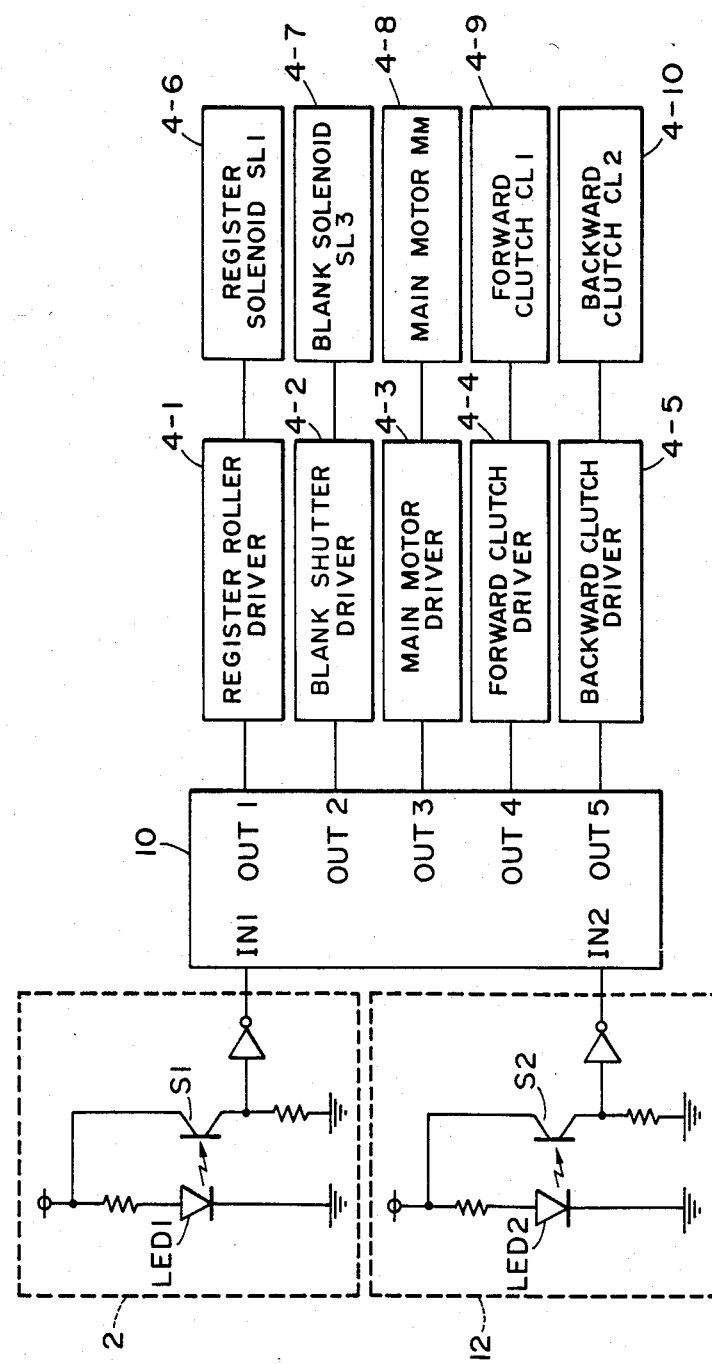
FIG. 4 shows a block diagram of a control circuit of the present invention.

FIG. 4 shows a block diagram of a control circuit which receives the signal S1 of the photo-interrupter 2 and a timing signal S2 derived from the timing disc 11 and the photo-interrupter 12, as control signals.

Numerals 2 and 12 denote the photo-interrupters, S1 denotes the photo-interrupter signal from the photo-interrupter 2, S2 denotes the timing signal from the photo-interrupter 12, numeral 10 denotes a microcomputer, for example, µCOM44, numeral 4-1 denotes a register roller drive circuit or driver, numeral 4-6 denotes a register solenoid SL1, numeral 4-2 denotes a blank shutter drive circuit driver, numeral 4-7 denotes a blank solenoid SL3, numeral 4-3 denotes a main motor drive circuit or driver, numeral 4-8 denotes a main motor $M_M$, numeral 4-4 denotes a forward clutch drive circuit or driver, numeral 4-9 denotes a forward clutch CL1, numeral 4-5 denotes a backward clutch drive circuit or driver and numeral 4-10 denotes a backward clutch CL2.

The photo-interrupter signal S1 and the timing signal S2 are applied to input terminals IN1 and IN2 of the microcomputer 10 as shown in FIG. 4 and the microcomputer 10 responds to the input signals to control the operations of the register rollers 17 and 18, The blank shutter 46, the main motor $M_M$, not shown, and the forward and backward clutches of the optical system in accordance with a control program prestored in a ROM of the microcomputer 10.

The respective controls are explained below in detail.

A first function of the photo-interrupter signal is a detection of the position of the movable optical system during an initialization operation which is carried out after the power on and before the copying operation starts. The initialization operation is referred to as an operation for preparing the copying machine to the copying operation, including the erasure of memory remaining on the drum, preheating of a heater and the detection of the position of the optical system. As described above, in order to start the copying operation, the optical system must be positioned at a predetermined position (hereinafter referred to as a home position). In a normal operation, the optical system is controlled and driven so that it returns to the home position at the end of the copying operation. However, the movable optical system may be stopped at non-home position when trouble, such as a jam, takes place or the power supply is turned off. In such cases it is necessary to return the optical system to the home position to prepare for the next copying operation, after the jam has been corrected or the power supply is turned on again. To this end, the position of the optical system is detected and returned to the home position when the power is turned on.

Figure 5B:
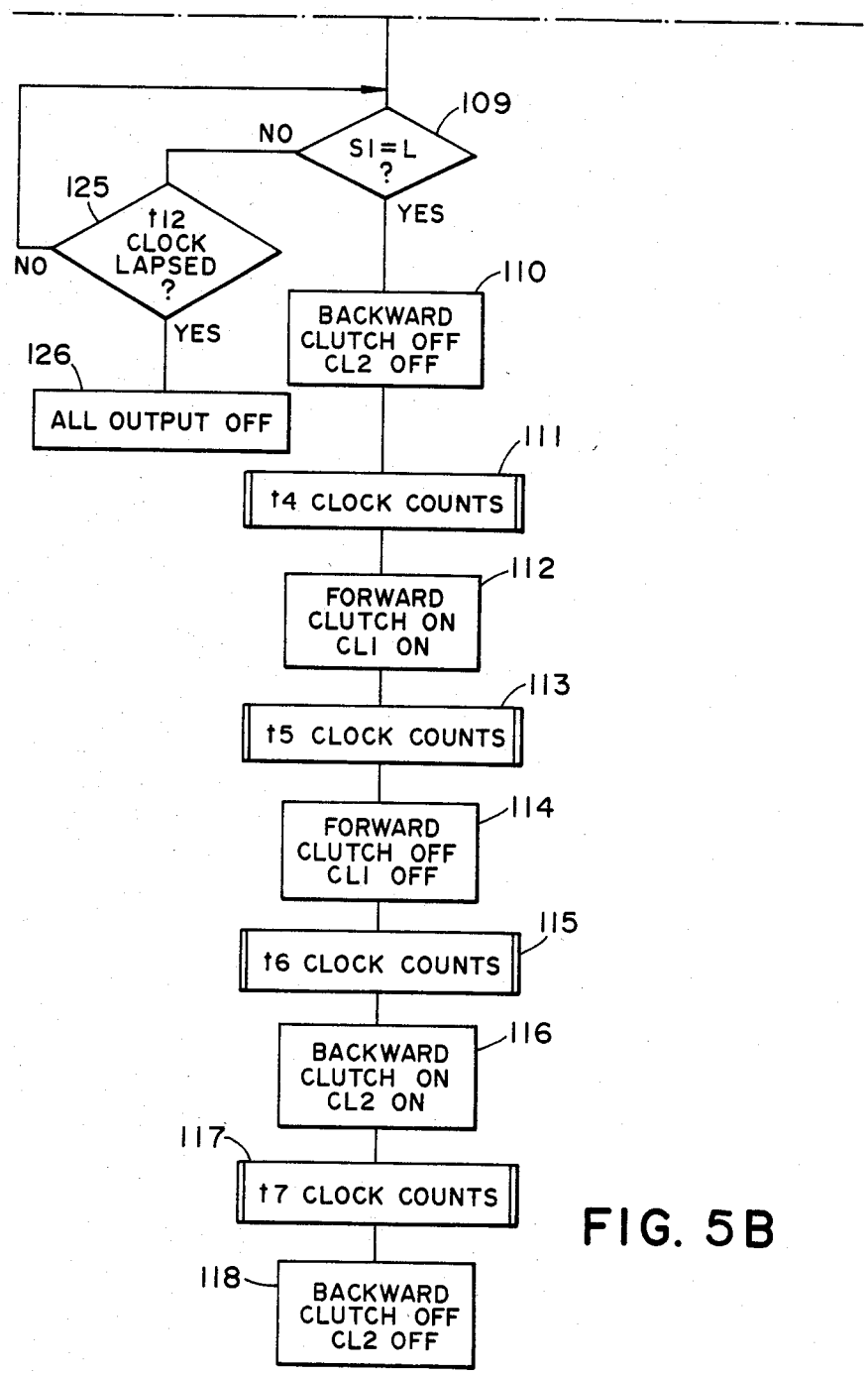
Figure 6A:
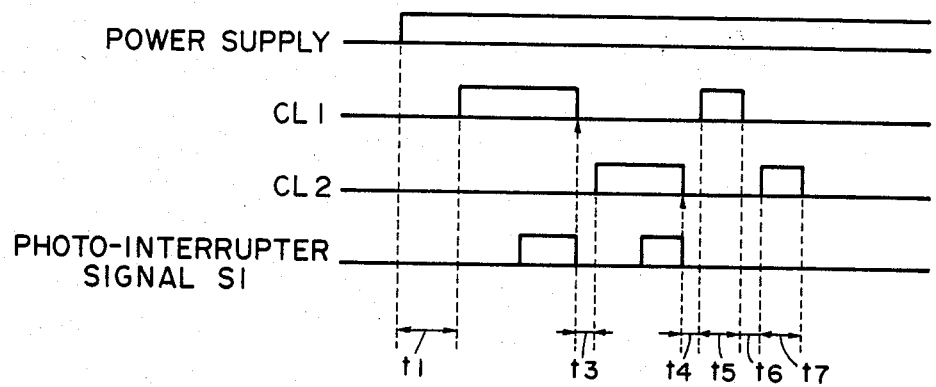
FIGS. 6A, 6B, 6C, and 8 show operation timing charts.
Figure 6B:
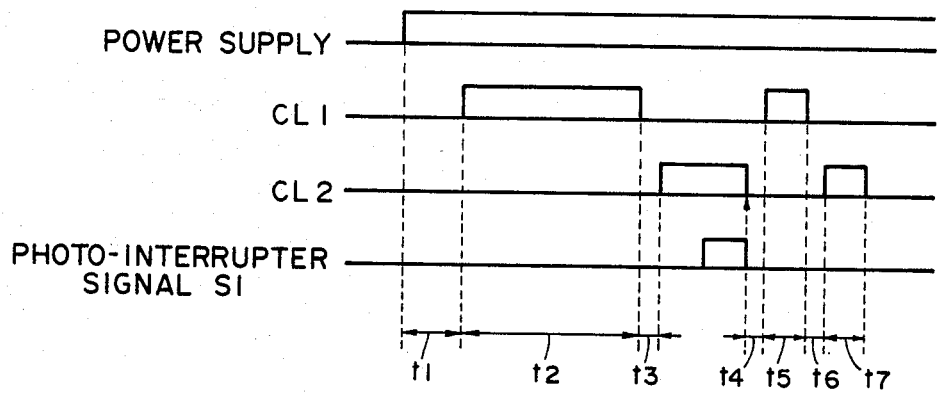
Figure 6C:
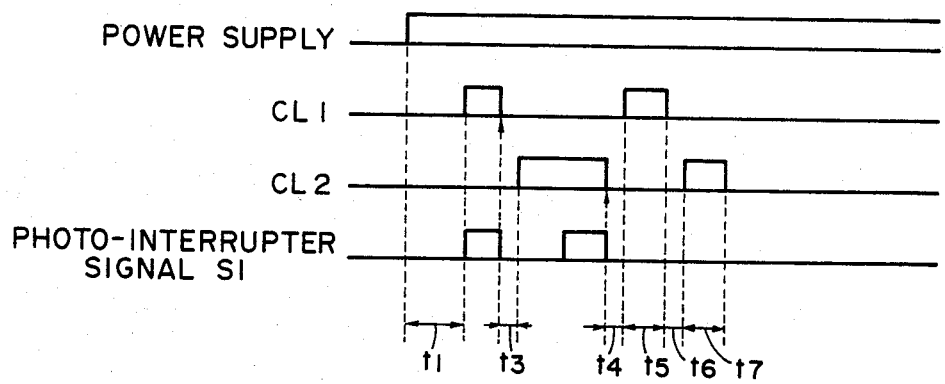

FIG. 5 shows a control flow chart of the microcomputer 10 for detecting the home position of the optical system when the power is turned on or during the initialization operation. FIG. 6 shows a time chart of the operation for detecting the home position. In the following description, clock counts t1–t12 are based on the timing signal S2 from the photo-interrupter 12. In the present embodiment, the home position of the movable optical system or the first mirror 3 is at the position shown in FIG. 2. In a step 100, the copying machine power is on. After a predetermined t1 clock count in a step 101, the forward clutch CL1 is driven in a step 102 to advance the optical system in the direction of an arrow F to detect the position of the mirror 3. In this case, the optical system may take one of three positions when the forward clutch CL1 is turned on, as described above. In the first case, the mirror 3 is off the photo-interrupter 2 towards the pulley 7 (including a case where the mirror 3 is at the home position), in the second case the mirror 3 is off the photo-interrupter towards the pulley 6, and in the third case the mirror 3 is on the photo-interrupter 2. The three mirror positions are detected in steps 103, 104 and 120. The first case where the light screen 1 is off the photo-interrupter 2 towards the pulley 7 is first explained. In the step 102, the forward clutch CL1 is turned on and the optical system starts to advance. The photo-interrupter signal S1 is L at this time and the process proceeds to a step 119. In the step 119, t2 clock is counted for a time to allow the light screen 1 to advance from the home position of the optical system beyond the photo-interrupter 2. In the step 120, if the light screen 1 advanced during the t2 clock count interrupts the photo-interrupter 2, the photo-interrupter signal S1 changes to H and the process proceeds to the step 104. In the step 104, if the advancing light screen 1 moves past the photo-interrupter 2 and the photo-interrupter signal S1 changes to L, the process proceeds to a step 105. In the step 105, the forward clutch CL1 is turned off to stop the optical system, and the process proceeds to a step 106. In the step 106, t3 clock is counted, and in a step 107 the backward clutch CL2 is turned on to retract the optical system in the direction of the arrow B. The process then moves to a step 108. In the step 108, if the photo-interrupter signal S1 changes to H, the process proceeds to a step 109. In the step 109, if the photo-interrupter signal S1 changes to L, the process proceeds to a step 110. In the step 110, the backward clutch CL2 is turned off to to stop the optical system and the process proceeds to a step 111. In the step 111, t4 clock is counted and in a step 112 to forward clutch CL1 is again turned on to advance the optical system, and the process proceeds to a step 113. In the step 113, t5 clock is counted and in a step 114 the forward clutch CL1 is turned off to stop the optical system. The process then proceeds to a step 115. In the step 115, t6 clock is counted and in a step 116 the backward clutch CL2 is turned on to retract the optical system, and in a step 117, t7 clock is counted. In a step 118, the backward clutch CL2 is turned off to stop the optical system. Through the series of steps described above, the optical system including the mirror 3 is returned to the home position. (See time chart in FIG. 6A).

The second case where the light screen 1 is off the photo-interrupter toward the pulley 6 is now explained. In the step 102, the forward clutch CL1 is turned on and the optical system starts to advance. The photo-interrupter signal is L at this time. Thus, the process proceeds from the step 3 to the step 119. In the step 119, t2 clock is counted and in the step 120 a change in the photo-interrupter signal is examined. Since the light screen 1 does not interrupt the photo-interrupter 2 during the advancement, the photo-interrupter signal remains L and the process proceeds to the step 105. In the step 105, the forward clutch CL1 is turned off to stop the optical system and the process proceeds to the step 106. Thus, the timing of the turn-off of the forward clutch CL1 is different from that of the first case. The subsequent steps are same as those in the first case. (See time chart in FIG. 6B).

In the third case, the light screen 1 interrupts the photo-interrupter 2 when the power is turned on. In the step 102, the forward clutch CL1 is turned on to advance the optical system. The photo-interrupter signal S1 is H at this time, and the process proceeds from the step 103 to the step 104. In the step 104, if the photo-interrupter signal S1 changes to L as the optical system advances, the process proceeds to the step 105 and the forward clutch CL1 is turned off to stop the optical system, and the process proceeds to the step 106. The subsequent steps are same as those of the first case. (See time chart in FIG. 6C).

Thus, by moving the optical system when the power is turned on to detect the position of the optical system and the optical system is controlled to return to the home position in accordance with the detected position.

Figures 7, 7A:
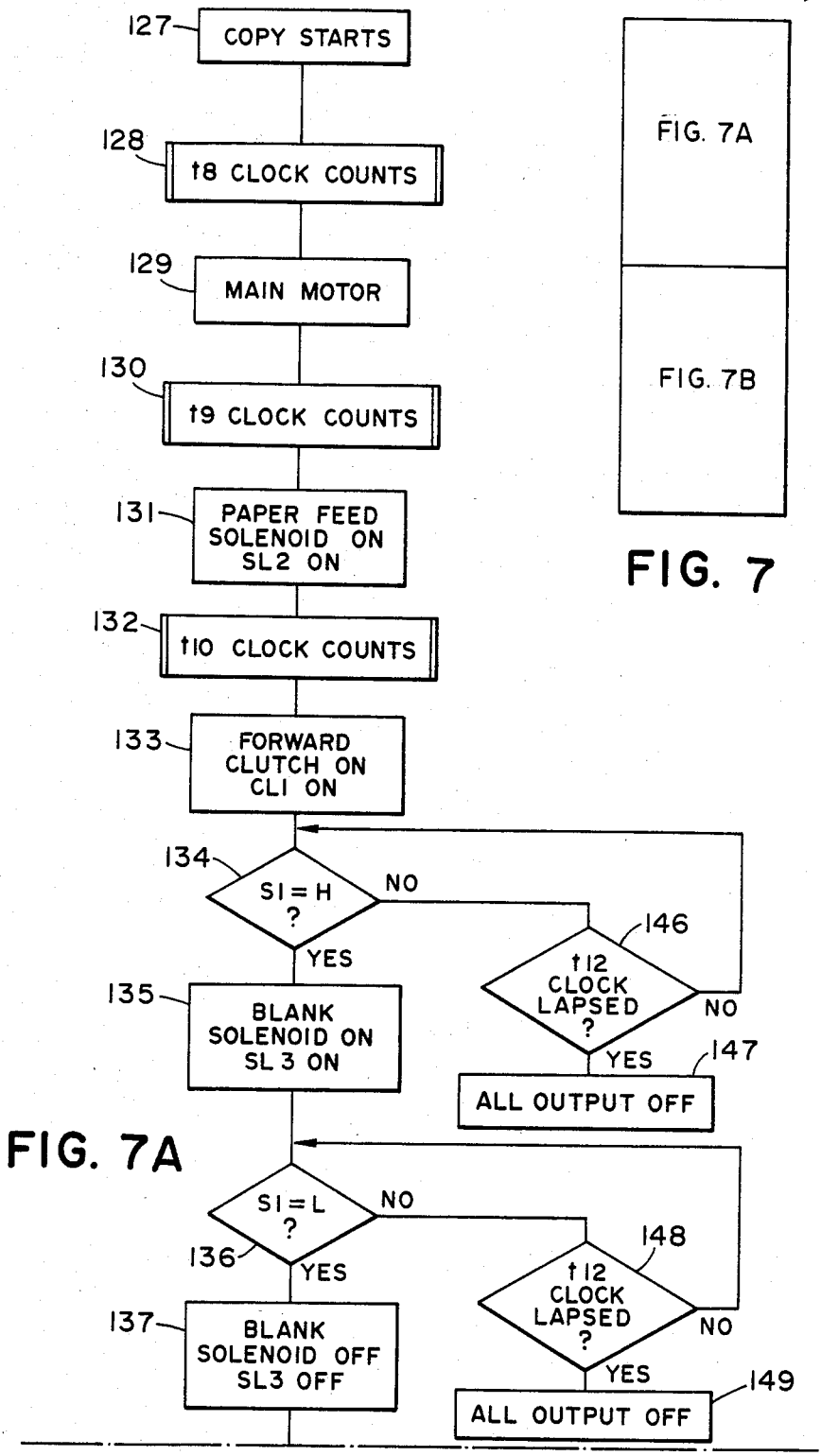
Figure 8:
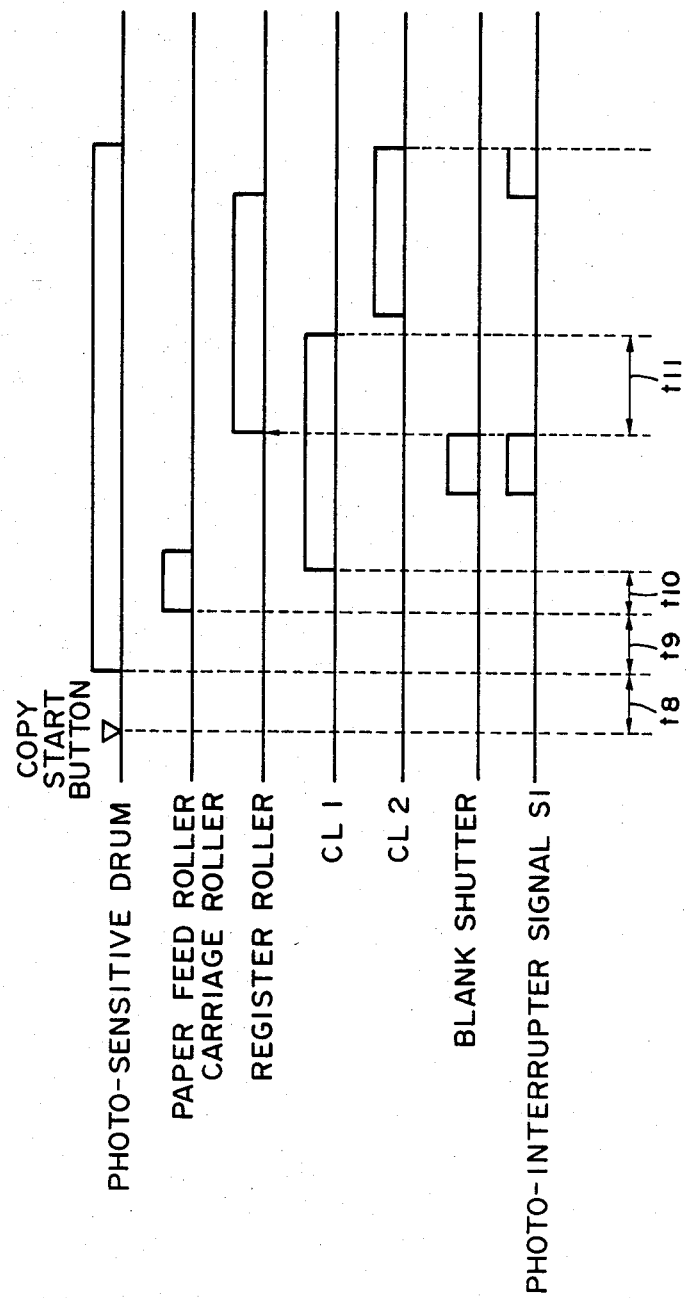

A second function of the photo-interrupter signal S1 is the sequence control in the copying operation. A control flow chart therefor is shown in FIG. 7, and an operation time chart therefor is shown in FIG. 8.

In a step 127, when a copy start instruction is supplied by a user through a copy start button, not shown, t8 clock is counted in a step 128 and the main motor $M_M$ is energized in a step 129 so that the photosensitive drum 20 starts to rotate. In a step 130, t9 clock is counted and in a step 131 a paper feed solenoid SL2, not shown, is energized so that the transfer paper P is taken out of the cassette 13 by the paper feed roller 14. The transfer paper P passes through the conveyor rollers 15 and 16 and is fed to the register rollers 17 and 18 where it is stopped. In a step 132, t10 clock is counted, and in a step 133 the forward clutch CL1 is turned on to scan the text so that the optical system starts to advance. In a step 134, if the photo-interrupter signal S1 changes to H as the optical system advances, the process proceeds to a step 135. In the step 135, the blank solenoid SL3 is energized to carry out the blank exposure and the process proceeds to a step 136. In the step 136, if the photo-interrupter signal S1 changes to L, the process proceeds to a step 137. In the step 137, the blank solenoid is deenergized and the process proceeds to a step 138. In the step 138, the register solenoid SL2 is turned on to drive the register rollers 17 and 18 for transferring the image on the photosensitive drum 20 with the transfer paper P being in registration therewith. A time point at which the photo-interrupter signal changes from H to L is used as a timing point. Thus, the transfer paper P is fed to the transfer station in synchronism with the photosensitive drum. In a step 139, t11 clock is counted and in a step 140 the forward clutch is turned off to terminate the viewing of the text. In a step 141, the backward clutch is turned on to return the optical system to the home position. In a step 142, if the photo-interrupter signal S1 changes to H, the process proceeds to a step 143. In the step 143, if the photo-interrupter signal S1 changes from H to L, the backward clutch SL2 is turned off in a step 144 and the process proceeds to a step 145 where the copying operation is terminated. The transfer paper P having the image transferred thereon is ejected to the paper ejection tray 40 through the fixing station 36 and 37.

As described above, during the copying operation, the photo-interrupter signal S1 controls the blank solenoid SL3, the register solenoid SL2, the forward clutch CL1 and the backward clutch CL2.

Figure 9A:
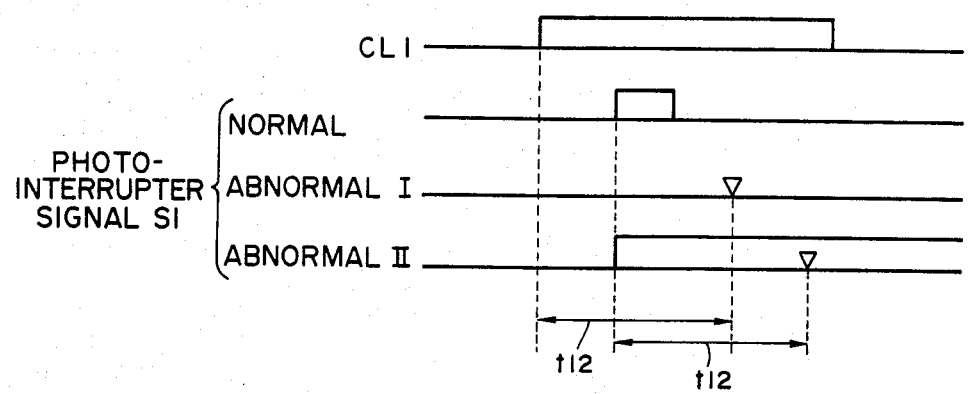
FIGS. 9A and 9B show operation timing charts of the failure diagnosis of the optical system.
Figure 9B:
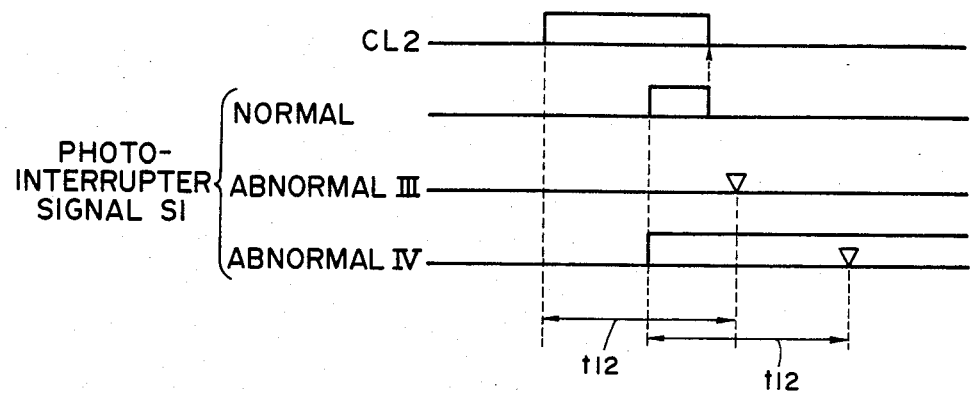

A third function of the photo-interrupter signal is the detection of errors in the movement of the optical system. The photo-interrupter signal S1 diagnoses two types of errors during the advancement and the retraction of the optical system or the mirror 3. An operation timing chart therefor is shown in FIGS. 9A and 9B. After the forward clutch CL1 has been turned on, if the photo-interrupter signal S1 remains L for more than t12 clock count as shown in a step 134 of FIG. 7 (error type I) or if the photo-interrupter signal S1 remains H for more than t12 clock count after the photo-interrupter signal S1 has changed from L to H as shown in a step 104 in FIG. 6 and a step 136 of FIG. 8 (error type II), it is determined that an error has occurred in the optical system which otherwise is advancing, and the step 134 goes to a step 147 through a step 146, the step 104 goes to the step 122 through the step 121 and the step 136 goes to a step 149 through a step 148 so that all outputs are turned off to stop the copying machine. If the photo-interrupter signal S1 remains L for more than t12 clock count after the backward clutch CL2 has turned on as shown in the step 108 of FIG. 5 and the step 142 of FIG. 7 (error type III) or if the photo-interrupter signal S1 remains H for more than t12 clock count after the photo-interrupter signal S1 has changed from L to H as shown in the step 109 of FIG. 5 and the step 143 of FIG. 7 (error type IV), it is determined that error has occurred in the optical system which otherwise is retracting, and the step 108 goes to the step 124 through the step 123, the step 142 goes to the step 151 through the step 150, the step 109 goes to the step 126 through the step 125, and the step 143 goes to the step 153 through the step 152 so that all outputs are turned off to stop the copying machine.

As described above, the signal generated by the combination of the photo-interrupter 2 which detects the movement of the optical system or the mirror 3, and the light screen 1 has the functions of detecting and restoring the home position of the optical system, controlling the sequence of the copying operation and detecting an error in the movement. The length of the light screen is variable so that a required timing is obtained.

The above signal may be used as a plurality of different control signals depending on the operational conditions of the apparatus. Accordingly, means for producing the signal in the apparatus is simplified and a low cost image forming apparatus is provided.

What we claim is:

1. An image forming apparatus, comprising:
   scanning means for scanning an original, and having a reciprocating member;
   driving means for causing said reciprocating member to move in a forward direction for original scanning and in a reverse direction; and
   control means for controlling said driving means to position said reciprocating member at a predetermined position, regardless of whether said reciprocating member is at the predetermined position, before the performance of an image forming operation, by a setting operation involving movement of the reciprocating member in both the forward and the reverse directions, said control means being arranged to determine, as an improper state of said apparatus, the failure of said reciprocating member to become positioned by the setting operation at the predetermined position.

2. An image forming apparatus according to claim 1, wherein said control means changes the direction of the movement of said reciprocating member after the movement thereof in the forward direction for a predetermined time to set said reciprocating member at the predetermined position.

3. An image forming apparatus according to claim 1, further comprising a sensor associated with one of the moving and setting operations.

4. An image forming apparatus according to claim 3, further comprising timer means for clocking time in synchronism with said control means, and means for determining an improper state of said apparatus if said sensor does not sense within a predetermined time.

5. An image forming apparatus according to claim 3, wherein said sensor is used to control the sequence for forming the image.

6. An image forming apparatus comprising:
   instructing means for instructing initiation of an image forming operation;
   means, including a reciprocating scanning member, for scanning an original to be reproduced in the image forming operation;
   driving means for causing said scanning member to move in reciprocation;
   detection means for detecting when said scanning member is at a predetermined position; and
   means for identifying first and second faults in the movement of said scanning member every scanning of the original after the initiation of the image forming operation is instructed by said instructing means, said identifying means being arranged to identify the first fault in response to the failure of said detection means to detect said scanning member within a first predetermined period during which said driving means is operating, said identifying means also being arranged to identify the second fault in response to the continuous detection by said detection means of said scanning member over a second predetermined period following the detection by said detection means of said scanning member within the first predetermined period.

7. An image forming apparatus according to claim 6, wherein said identifying means includes timer means operable to time the first predetermined period in accordance with the operation of said driving means.

8. An image forming apparatus according to claim 6, wherein said identifying means includes timer means operable to time the second predetermined period in accordance with the detection of said scanning member by said detection means.

9. An image forming apparatus according to claim 6, further comprising control means for controlling said driving means to cause said scanning member to move in accordance with an output of said detection means.

10. An image forming apparatus according to claim 6, further comprising image forming means for forming on a recording member an image derived from the scanning of the original by said scanning means.

11. An image forming apparatus according to claim 7 wherein said timer means comprises a counter for counting clock pulses generated in synchronism with the image forming operation.

12. An image forming apparatus according to claim 8, wherein said timer means comprises a counter for counting clock pulses generated in synchronism with the image forming operation.

13. An image forming apparatus according to claim 6, wherein the image forming operation is stopped upon the identification of a fault by said identifying means.

14. An original image scanning apparatus, comprising:
   scanning means for scanning an original, said means including a reciprocating member;
   driving means for causing said reciprocating member to move in a forward direction and in a reverse direction for original scanning;
   control means for controlling said driving means such that said reciprocating member is moved in both the forward and the reverse directions before the performance of said original scanning; and
   identifying means for identifying a fault in the movement of said reciprocating member before the performance of said original scanning.

15. An apparatus according to claim 14, wherein an image forming operation is inhibited when said identifying means identifies the fault.

16. An apparatus according to claim 14, further comprising means for performing image formation based on an image of the original scanned by said scanning means.

17. An apparatus according to claim 14, wherein said control means controls said driving means such that said reciprocating member is moved in the backward direction after being moved in the forward direction.

18. An apparatus according to claim 14, wherein said control means controls said driving means to set said reciprocating member at a predetermined position.

19. An image forming apparatus, comprising:

a reciprocable member for image formation;

driving means for causing said member to reciprocate; and control means for controlling said driving means to cause said member to reciprocate prior to the performance of an image forming operation so as to set said member at a predetermined position, and for identifying a fault in the movement of said member if it is not set at the predetermined position.

20. An apparatus according to claim 19 wherein the image forming operation is inhibited when said control means identifies the fault.

21. An apparatus according to claim 19, wherein said control means controls said driving means such that after a power source turns on, said moving member is reciprocated to be set at the predetermined position.

22. An apparatus according to claim 19, further comprising means for detecting a position of said moving member, and wherein said control means identifies the fault when said detecting means does not detect said moving member within a predetermined time.

23. An apparatus according to claim 19, wherein said moving member is a scanning means for scanning an original.

* * * * *